US006617560B2

(12) United States Patent
Forke

(10) Patent No.: US 6,617,560 B2
(45) Date of Patent: Sep. 9, 2003

(54) LIGHTING CONTROL CIRCUIT INCLUDING LED FOR DETECTING EXPOSURE TO RADIATION

(75) Inventor: Ulrich Forke, Santa Clara, CA (US)

(73) Assignee: Watt Stopper, Inc., Santa Clara, CA (US)

( * ) Notice: Subject to any disclaimer, the term of this patent is extended or adjusted under 35 U.S.C. 154(b) by 0 days.

(21) Appl. No.: 09/871,312

(22) Filed: May 30, 2001

(65) Prior Publication Data

US 2002/0179815 A1 Dec. 5, 2002

(51) Int. Cl.$^{7}$ .......................... G01J 1/32; H01J 40/14; H05B 37/02

(52) U.S. Cl. .............................. 250/205; 250/214 AL; 315/150

(58) Field of Search ............................... 250/205, 206, 250/214 R, 214.1, 214 AL, 214 B; 315/150, 156, 158; 327/514

(56) References Cited

U.S. PATENT DOCUMENTS

| | | | | |
|---|---|---|---|---|
| 3,912,866 A | | 10/1975 | Fox | 179/1 |
| 3,993,569 A | | 11/1976 | Zinsmeyer et al. | 250/209 |
| 4,021,679 A | | 5/1977 | Bolle et al. | 307/117 |
| 4,093,943 A | | 6/1978 | Knight | 340/220 |
| 4,233,545 A | | 11/1980 | Webster et al. | 250/214 |
| 4,330,706 A | * | 5/1982 | Lawenhaupt | 250/208.4 |
| 4,628,496 A | | 12/1986 | Lee | 367/93 |
| 4,695,769 A | | 9/1987 | Schweickardt | 315/158 |
| 4,751,623 A | | 6/1988 | Gaines et al. | 362/276 |
| 4,757,430 A | | 7/1988 | Dubak et al. | 362/100 |
| 4,820,938 A | | 4/1989 | Mix et al. | 307/117 |
| 5,015,994 A | | 5/1991 | Hoberman et al. | 340/567 |
| 5,189,393 A | | 2/1993 | Hu | 340/522 |
| 5,307,051 A | | 4/1994 | Sedlmayr | 340/573 |
| 5,489,827 A | | 2/1996 | Xia | 315/294 |
| 5,495,402 A | | 2/1996 | Houssian | 362/226 |
| 5,640,143 A | | 6/1997 | Myron et al. | 340/541 |
| 5,699,243 A | | 12/1997 | Eckel et al. | 364/140 |
| 5,701,058 A | | 12/1997 | Roth | 315/158 |
| 5,713,655 A | | 2/1998 | Blackman | 362/95 |
| D393,912 S | | 4/1998 | Yuen | D26/26 |
| 5,763,872 A | | 6/1998 | Ness | 250/214 |
| D409,317 S | | 5/1999 | Yuen | D26/26 |
| 5,932,861 A | | 8/1999 | Iwaguchi et al. | 235/455 |
| 6,051,787 A | | 4/2000 | Rintz | 174/66 |
| D425,222 S | | 5/2000 | Yuen | D26/26 |
| D425,638 S | | 5/2000 | Yuen | D26/26 |
| 6,084,231 A | | 7/2000 | Popat | 250/214 |
| 6,087,588 A | | 7/2000 | Soules | 174/66 |
| D431,660 S | | 10/2000 | Yuen | D26/26 |
| 6,132,057 A | | 10/2000 | Williams | 362/100 |
| 6,151,529 A | | 11/2000 | Batko | 700/28 |
| 6,172,301 B1 | | 1/2001 | Goodsell | 174/66 |
| RE37,135 E | | 4/2001 | Elwell | 315/154 |
| 6,337,541 B1 | | 1/2002 | Dickie et al. | 315/169.3 |
| 6,343,134 B1 | | 1/2002 | Czerwinski | 381/342 |
| 6,390,647 B1 | | 5/2002 | Shaefer | 362/276 |

OTHER PUBLICATIONS

Vishay, Vishay Telefunken, "Physics of Optoelectronic Devices Light–Emitting Diodes,"December 1999, pp. 1–7.

Vishay, Vishay Telefunken. "Measuring Technique General," December 1999, pp. 1–9.

Asian Technology Information Program (ATIP), "Blue LED's Breakthroughs and Implications," ATIP Report ATIP95.59, Aug. 27,1995, See www.cs.arizona.edu/japan/atip/public/atip.reports.95/atip95.59r.html.

(List continued on next page.)

*Primary Examiner*—Stephone Allen
(74) *Attorney, Agent, or Firm*—Haverstock & Owens LLP

(57) ABSTRACT

The present invention provides a lighting control circuit having an LED that outputs a first signal in response to being exposed to radiation, a detection circuit coupled to the LED. The detection circuit is configured to generate a second signal from the first signal. A driver circuit is coupled to the detection circuit, and the driver circuit is configured to generate a third signal to control an illumination level of one or more lights. The third signal is varied in response to the second signal.

26 Claims, 8 Drawing Sheets

OTHER PUBLICATIONS

Energy User News, "The Coming Revolution in Lighting Practice," by Sam Berman, October 2000, pp. 24–26.

IESNA Paper #59, "Characterizing Daylight Photosensor System Performance to Help Overcome Market Barriers, " by Andrew Bierman et al.

Journal of the Illuminating Engineering Society, "Improving the Performance of Photo–Electrically Controlled Lighting Systems," by Francis Rubinstein et al., Winter 1989, pp. 70–94.

Specifier Reports, "Photosensors –Lightsensing devices that control output form electric lighting systems", National Light Product Information Program, vol. 6 No. 1, March 1998, pg. 1 of 20.

"Si Photodiode –S7686", Hamamatsu, pp. 1.

"Si Photodiodes –S6626, S6838", Hamamatsu, pp. 1–2.

"Si Photodiodes –S7160, S7160–01", Hamamatsu, pp. 1–2.

* cited by examiner

LIGHTING CONTROL CIRCUIT INCLUDING LED FOR DETECTING EXPOSURE TO RADIATION

BACKGROUND OF THE INVENTION

The present invention relates generally to controlling the output of lights. More particularly, embodiments of the invention relate to a method and apparatus that use an LED as a light sensor for detecting light levels in an area or room.

Lighting control circuits are used with electronic dimming ballasts. These ballasts control the output of lights, such as fluorescent lights, that illuminate areas such as rooms, offices, patios, etc.

Traditionally, photocells and photodiodes are used as photo-transducers or light sensors for lighting control systems. A photocell is a device that detects light in a controlled area or room. It then uses information from the light, e.g., illumination level, to adjust light output in the controlled area.

Photocells and photodiodes are wide spectrum sensors and they respond to a spectrum much wider than the spectrum perceived by the human eye. This is acceptable for a variety of lighting control systems including systems operating in areas were the controlled light has the same spectrum all times, e.g., where only fluorescent lights are delivering the illumination. If the spectrum distribution remains the same, the resultant electrical energy is proportional to visible energy or light. Hence, a lighting control system can be adjusted to keep the visible light level constant.

Typically, the light in a controlled area or room has two or more different contributing light sources, e.g., artificial light plus sunlight. This is the condition commonly encountered in real life. For example, the controlled light source is typically fluorescent lights and the variable or "disturbing" source is the sun, i.e., daylight. Note that for the purposes of discussion, the terms sunlight, daylight and natural light are used synonymously. Similarly, the terms electrically produced light and artificial light are used synonymously. Artificial light would include for example fluorescent light, incandescent light, etc.

The radiometric energy spectrum of sunlight is wider than that of electronically produced light such as fluorescent light. Thus, different light sources could have different energy spectrums. Also, the human eye perceives only a part of the energy spectrum emitted by all available light sources, e.g., sun light, incandescent light, fluorescent light, etc. Research done on a variety of human subjects shows that the sensitivity of the human eye varies with the lighting level. It is widely accepted by specialists in the field that under daylight conditions the spectral response of the human eye can be approximated by the so-called "photopic curve." This has a well-known bell shape and ranges from about 460 nm to 680 nm wavelengths, with the peak in the region of 560 nm. Some research has shown that under poor illumination conditions the human eye changes its spectral sensitivity. A new characteristic has been devised for this behavior. It is called the "scotopic curve." This is centered at about 410 nm and covers the spectrum from about 380 nm to 450 nm. In analyzing its overall behavior, it is perhaps appropriate to say loosely that the human eye can perceive light in the range of 400 nm to 700 nm.

A problem arises because most conventional photo-transducers capture or detect the entire energy spectrum produced by all light sources. Thus, when the photo-transducer transforms the captured light energy into a current, it does not distinguish between different wavelengths of light, i.e., sunlight and artificial light. This conventional design of lighting control systems is based on the assumption that the current represents visible light. Unfortunately, this is a poor assumption. In one known light controller circuit, for example, a current resulting from both natural and artificial light components is interpreted by a subsequent circuit as though it is a current merely resulting from the artificial light contribution. Accordingly, the system dims the artificial lights until the resultant voltage equals a set point or preset illumination level. This is problematic because the resultant voltage is derived from both natural and artificial light components which include non-visible energy, while the preset illumination level is set according to visible light standards, e.g., 40 foot candles. Consequently, in most cases, this results in full dimming of the artificial lights while the incoming daylight clearly provides insufficient illumination for a typical room.

Some circuits use a light filter to allow only the visible spectrum to reach the photo-transducer. For example, an optical filter placed over a photo-transducer can achieve this. This would mimic the photopic curve or visible spectrum. Light sensors using optical filters are much more efficient than conventional photocells used without such filters. Optical filters, however, are expensive. These special pick-up heads are typically used in some professional applications. Note, as used herein, the term optical sensor is used to mean a photo-transducer used with an optical filter.

Thus, it is desirable to have an alternative lighting control circuit that can detect a spectrum of light close to that which the human eye detects.

SUMMARY OF THE INVENTION

The present invention achieves the above needs with a new lighting control circuit. More particularly, the present invention provides a lighting control circuit having an LED that outputs a first signal in response to being exposed to radiation, a detection circuit coupled to the LED. The detection circuit is configured to generate a second signal from the first signal. A driver circuit is coupled to the detection circuit, and the driver circuit is configured to generate a third signal to control an illumination level of one or more lights. The third signal is varied in response to the second signal.

In another embodiment, the driver circuit receives the second signal and compares it to a fourth signal. The driver circuit is configured to match the second signal with the fourth signal via a loop, thereby either raising or lowering the illumination level of one or more lights until the second signal and the fourth signal match.

In another embodiment, the first signal is amplified. In another embodiment, a light spectrum detected by the LED substantially mimics the photopic curve. In yet another embodiment, the fourth signal is adjustable and represents a desired illumination level. In yet another embodiment, the lighting control circuit adjusts the ambient light in response to changes in the ambient light.

In another embodiment, a lighting control circuit includes an LED that outputs a first signal in response to being exposed to radiation. A detection circuit couples to the LED and is configured to generate a second signal from the first signal. A driver circuit couples to the detection circuit and is configured to generate a third signal to control an illumination level of one or more lights. The third signal is varied in response to the second signal, and the driver circuit receives the second signal and compares it to a fourth signal. Also included is a loop which has an opto-electric path and an electronic path. The opto-electric path travels from a light source controlled by the lighting control circuit to the LED via the radiation from the light. The electronic path travels from the LED to the light source via the lighting control circuit. The driver circuit is configured to match the second signal to the fourth signal via the loop, thereby either raising or lowering the illumination level of one or more lights until the second signal and the fourth signal match.

In another embodiment, a method for controlling the brightness level of a light is provided. The method includes exposing an LED to radiation, outputting from the LED a first signal in response to the radiation exposure, generating a second signal from the first signal, and generating a third signal to control an illumination level of one or more lights, wherein the third signal is varied in response to the second signal.

In another embodiment, the step of generating the second signal includes amplifying the first signal. In yet another embodiment, the step of generating the third signal includes comparing the second signal to a fourth signal and matching the second and fourth signals. In yet another embodiment, the step of matching further included adjusting the ambient light level until the second signal matches the fourth signal.

In another embodiment, a lighting control circuit includes an LED that emits light when driven by a current and detects light when the current is turned off. The LED outputs a first signal in response to a detected light. A driver circuit couples to the LED and provides a current-to-voltage transfer ratio to operate with the LED. A multiplexer couples to the driver circuit and selects a first mode and a second mode, the LED having a first polarity during the first mode and a second polarity during the second mode. During the first mode the LED emits light when driven by a current. During the second mode the LED detects light and generates the first signal when the current is turned off. The lighting control circuit controls an illumination level of one or more lights in response to the first signal. In another embodiment, the LED detects a spectrum that approximates a photopic luminosity curve. In yet another embodiment, the photopic luminosity curve approximates a C.I.E. relative photopic luminosity curve.

Embodiments of the present invention achieve their purposes in the context of known circuit technology and known techniques in the electronic arts. Further understanding, however, of the nature, objects, features, aspects and embodiments of the present invention is realized by reference to the latter portions of the specification, accompanying drawings, and appended claims. Other objects, features, aspects and embodiments of the present invention will become apparent upon consideration of the following detailed description, accompanying drawings, and appended claims.

DESCRIPTION OF THE SPECIFIC EMBODIMENTS

Figure 1:
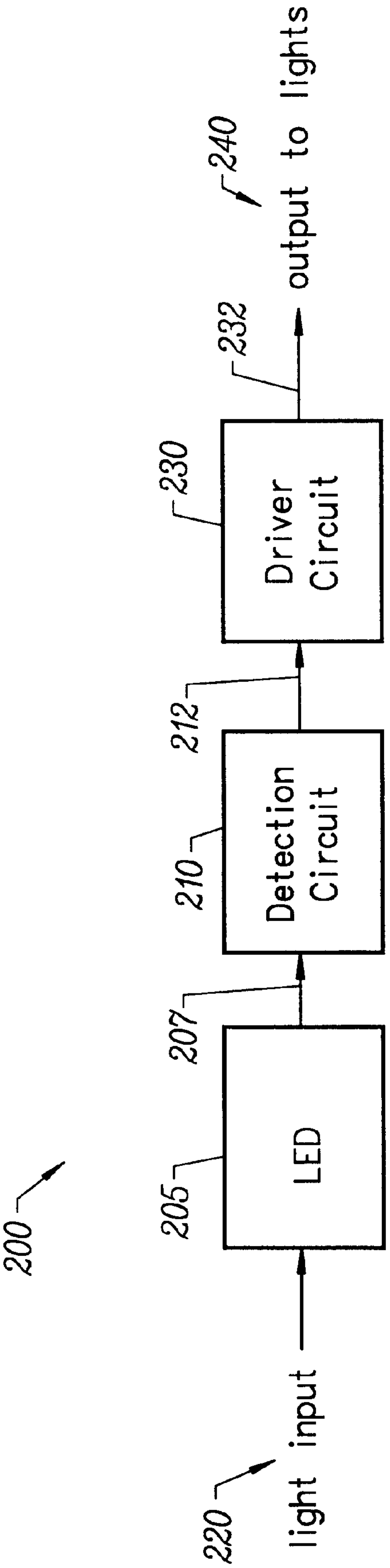
FIG. 1 shows a simplified high-level block diagram of a lighting control circuit including a detection circuit and a driver circuit, according to an embodiment of the present invention.

FIG. 1 shows a simplified high-level block diagram of a lighting control circuit 200 that includes an LED 205, a detection circuit 210 and a driver circuit 230, according to an embodiment of the present invention.

When LED 205 is bombarded with photons, it produces a small current or signal 207. The strength of the signal is proportional to the amount of light or illumination level. Embodiments of the present invention use a low-noise, low-power amplifier to amplify the LED's lower operating current. The pick-up efficiency of an LED is increased to levels comparable to those of other commonly used sensors such as conventional wide spectrum sensors.

Figure 2:
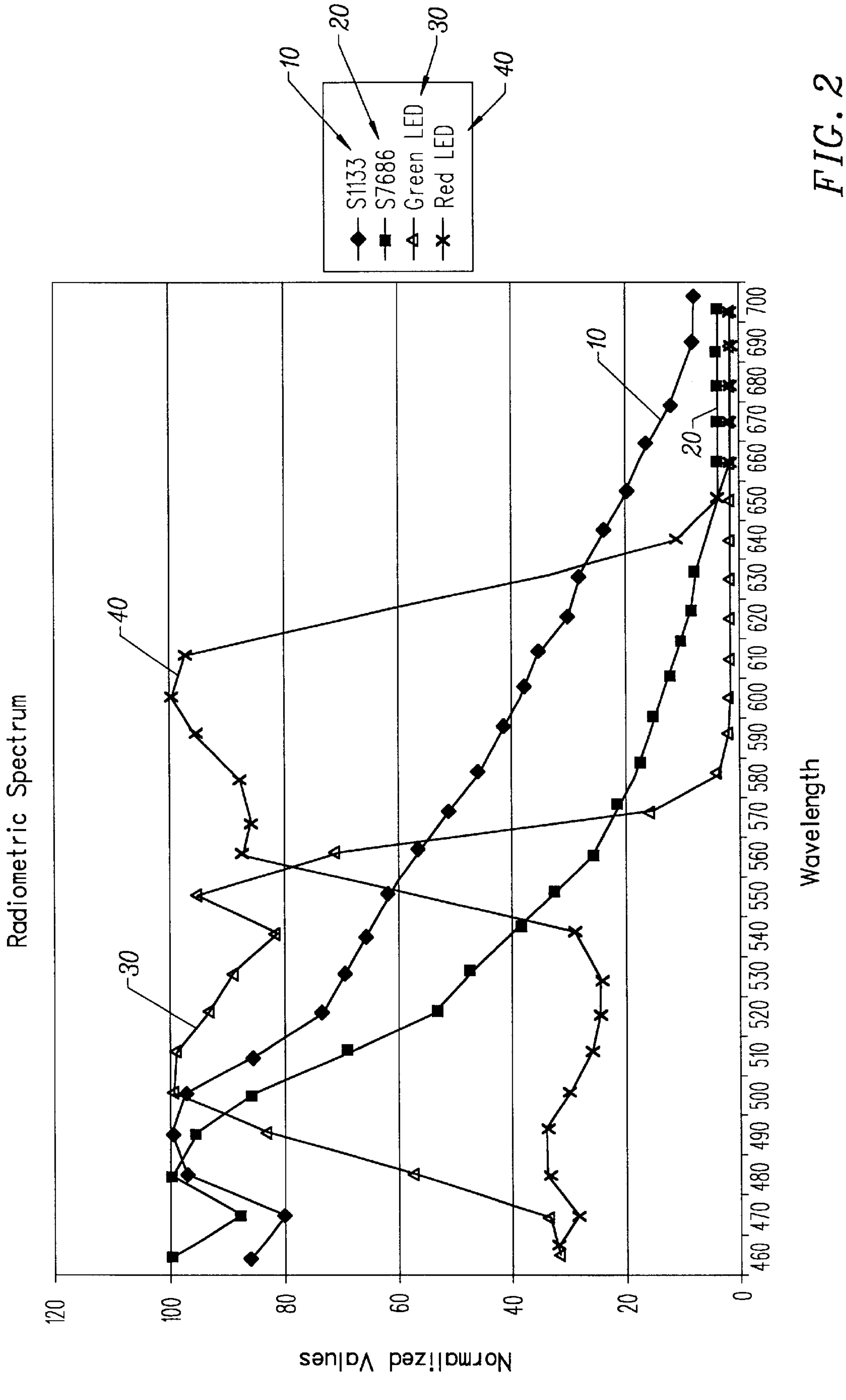
FIG. 2 shows a graph including a radiometric spectrum for two types of optical sensors and two types of LEDs.

FIG. 2 shows a graph including radiometric spectrum for two types of optical sensors and two types of LEDs. The human eye perceives light approximately in the range of 400 nm to 700 nm, or the photopic curve. An optical sensor can be used to capture only the spectrum of light seen by the human eye, under normal illumination. An optical sensor 10 can capture light having wavelengths of 460 to 670 nm. Similarly, an optical sensor 20 can capture light having wavelengths of 460 to 600 nm. The photopic curve ranges from about 460 nm to 680 nm wavelengths. Thus, an optical sensor can capture the photopic curve. The photopic curve is also referred to as the "photopic luminosity curve." One standard for the photopic curve has been established by C.I.E., a European standardization committee. This curve is referred to as the "C.I.E. relative photopic luminosity curve."

LEDs are normally used to emit light. The light emitted from an LED has wavelengths that fall within a certain range depending on the type of LED. For example, a green LED emits light having wavelengths ranging from 470 nm to 570 nm, and a red LED emits light having wavelengths ranging from 540 nm to 630 nm.

While LEDs are known to emit light, it is possible for them to detect light. The captured spectrum of the LED is same as its emitted spectrum. This spectrum is fairly narrow and can be manufactured to cover a known band. For example, a green LED 30 captures light having wavelengths ranging from 470 nm to 570 nm, and red LED 40 captures light having wavelengths ranging from 540 nm to 630 nm. Accordingly, green and red LEDs can capture a substantial portion of the photopic curve. Because LEDs are inexpensive and already mass-manufactured, a very useful light spectrum can be achieved.

In this and other specific embodiments, the LED in combination with the lighting control circuit is configured to emulate a true illuminance sensor and to respond to the photopic curve with sufficient accuracy. Of course, the precise photopic luminosity curve that the LEDs emulates will depend on the specific application. In this particular embodiment, light is measured in lux units. In other embodiments, light can be measured in foot-candle units. The lighting control circuit provides true foot-candle and lux readings with sufficient accuracy. The exact accuracy of emulation will depend on the specific application. For example, the lighting control circuit can be calibrated to differ no more than 10% from the true photopic curve. Moreover, the lighting control circuit can be calibrated to differ no more than 10% from a user's specifications. Such accuracy can provide a very reliable meter.

Multiple LEDs of various combinations can be used to expand the range of detected radiation various purposes. For example, with fair accuracy, an arrangement of red, blue, and green LEDs could expand the range of detected radiation to match that of visible light or for other purposes. With such characterization of light, embodiments of the present invention can have a variety of applications such as conserving energy, identifying a particular light source, etc.

Referring again to FIG. 1, detection circuit 210 couples to driver circuit 230. Detection circuit 210 converts the light energy, detected by LED 205, into an electrical signal and amplifies the signal to a workable level (signal 212). Detection circuit 210 then sends the signal to driver circuit 230.

Driver circuit 230 compares the signal from detection circuit 210 to a set point signal and matches the two via a loop. This set point signal is adjustable and represents a desired illumination level. If the illumination level is too high, detection circuit 230 lowers the voltage (signal 232) at an electronic ballast to dim a light source (not shown) until the light matches the desired illumination or light level. Conversely, if the illumination level is too low, detection circuit 230 raises the voltage (signal 232) at the electronic ballast to brighten the light source until the light matches the desired light level.

The lighting control circuit of FIG. 1 operates in a closed-loop environment. That is, the circuit takes the information related to the existing illumination level in a controlled area, such as in a particular room or office, and then compares the information to a preset value, or desired illumination level. The light sensor (LED) is placed in the same environment as the user. The circuit then varies the output of the controlled light sources to match the actual illumination level to the preset value. The main advantage of this approach is that the system adjusts the lighting outcome based on the amount of illumination that it receives from the controlled area. Being designed with a closed-loop, embodiments of the present invention can customize the light to a particular room and accurately control lighting in offices, skylit areas, cafeterias, warehouses and any other area with natural light access.

The closed-loop circuit of FIG. 1 includes two paths: an opto-electric path and an electronic path. The opto-electric path travels from the light source controlled by the ballast to the light sensor of detection circuit 210 via the light medium. Stated differently, the opto-electric path includes an electrical interpretation of light intensity or illumination. The electronic path travels from the light sensor to the light source via lighting control circuit 200.

Embodiments of the present invention offer significant benefits. It uses an LED as a light sensor making it inexpensive and simple to make. It is also eliminates the costs associated with expensive optical filters. This brings down manufacturing costs. Also, because LEDs are widely available, procurement becomes much simpler. Embodiments of the present invention also eliminate problems described above associated with conventional wide spectrum photodetectors.

Figure 3:
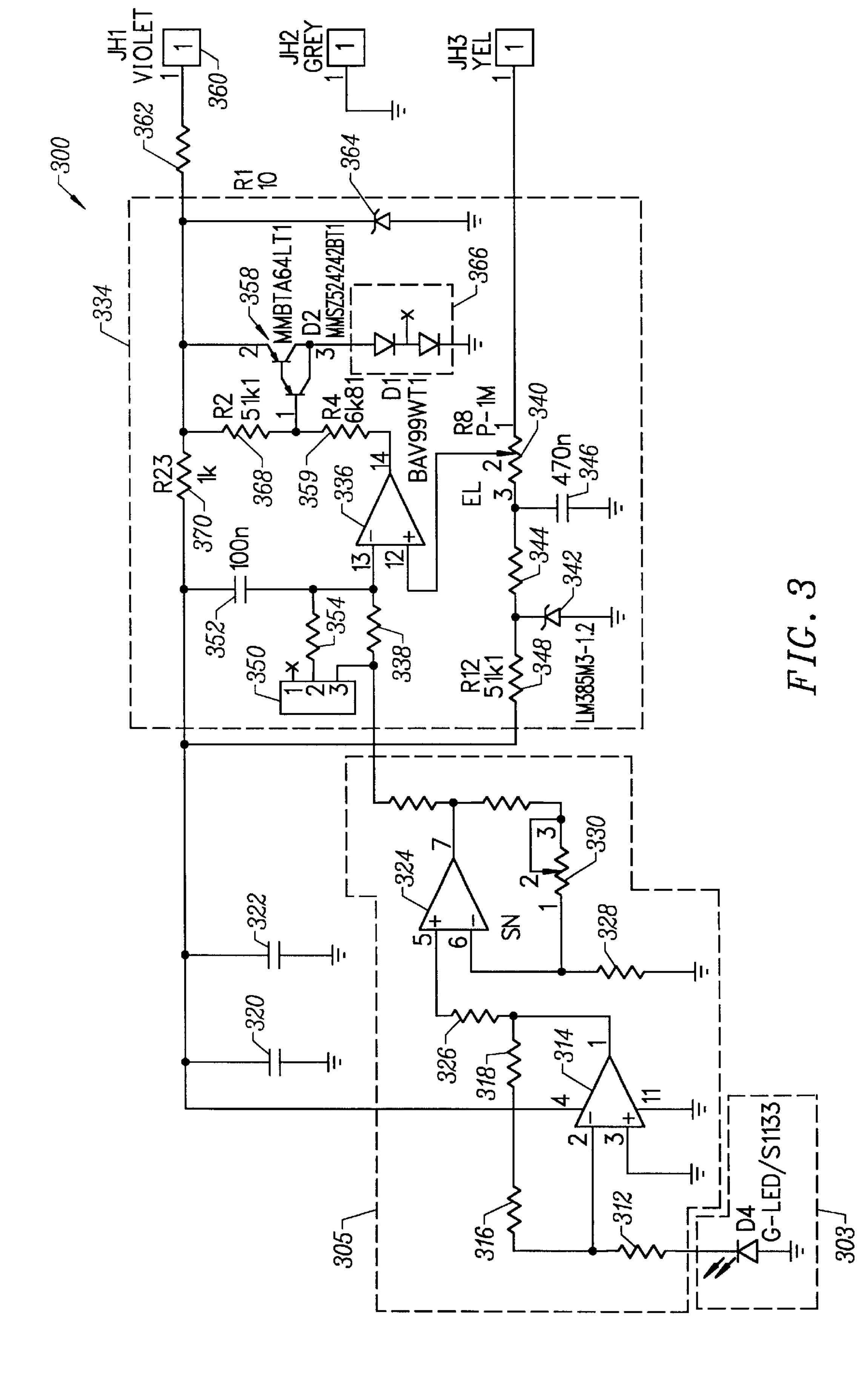
FIG. 3 shows one example of a simplified schematic diagram of a lighting control circuit, according to the embodiment of FIG. 1.
Figure 4A:
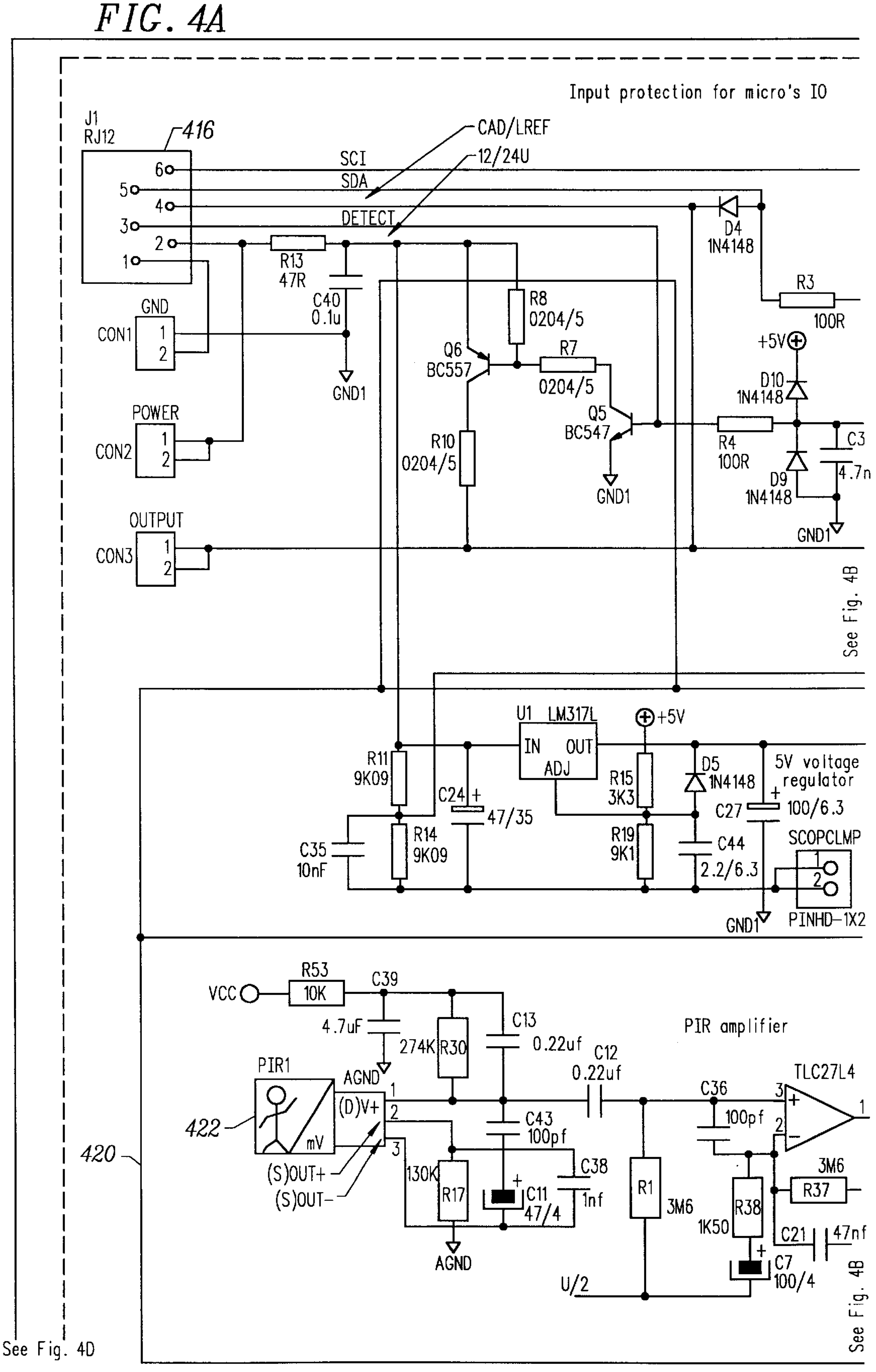
FIGS. 4A–4E show a simplified schematic diagram of a lighting control circuit, according to another embodiment of the present invention.
Figure 4B:
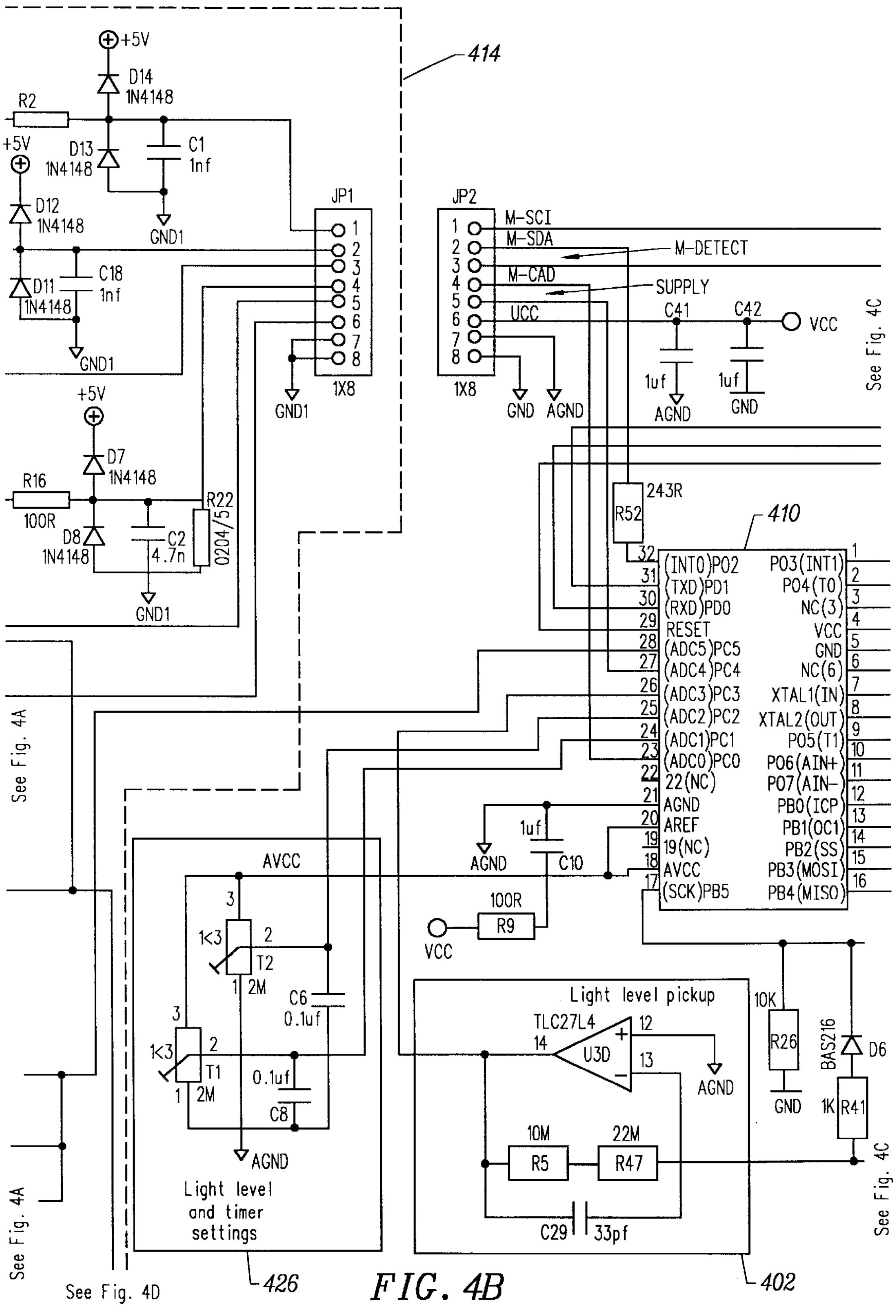
Figure 4C:
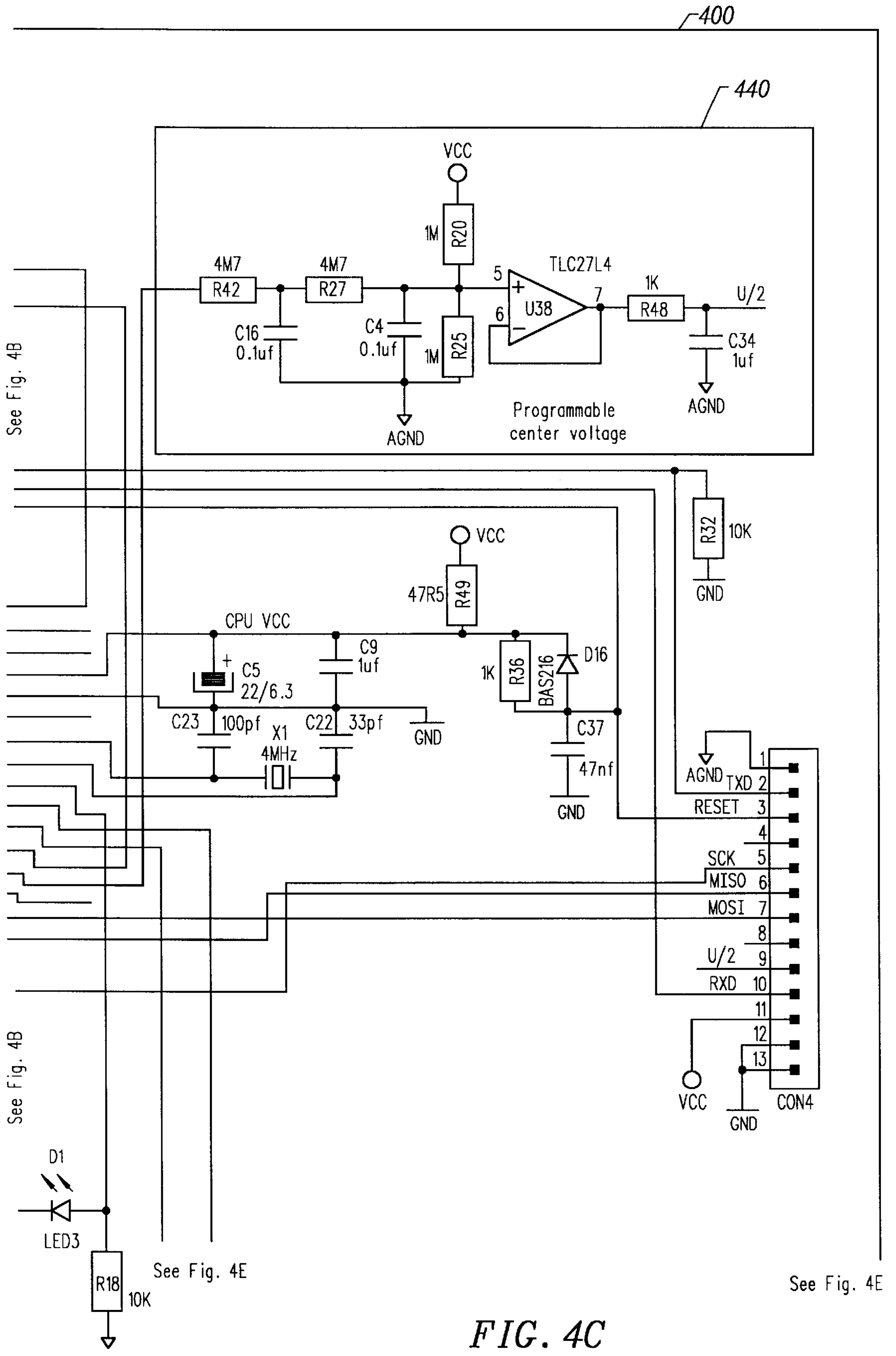
Figure 4D:
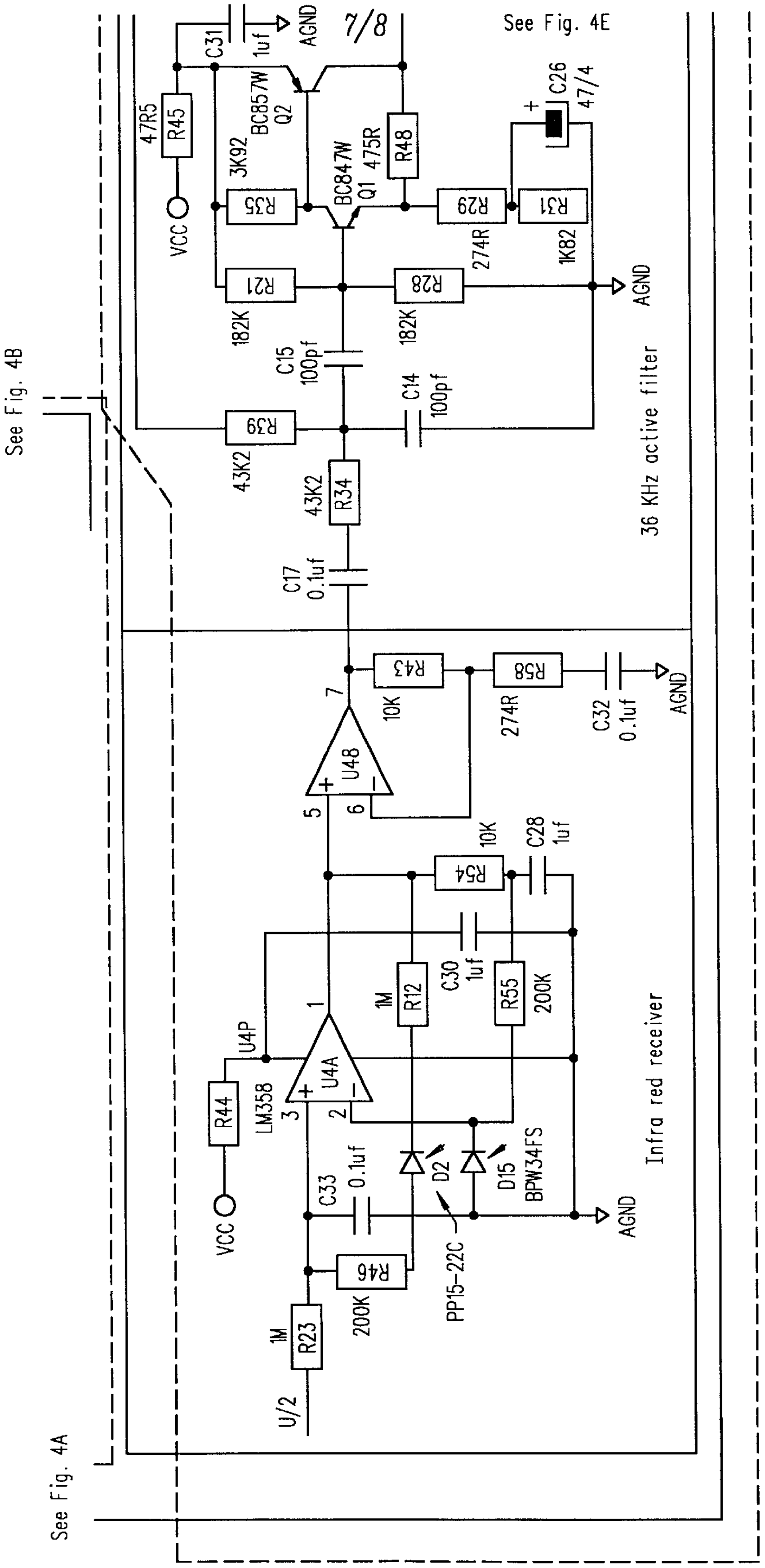
Figure 4E:
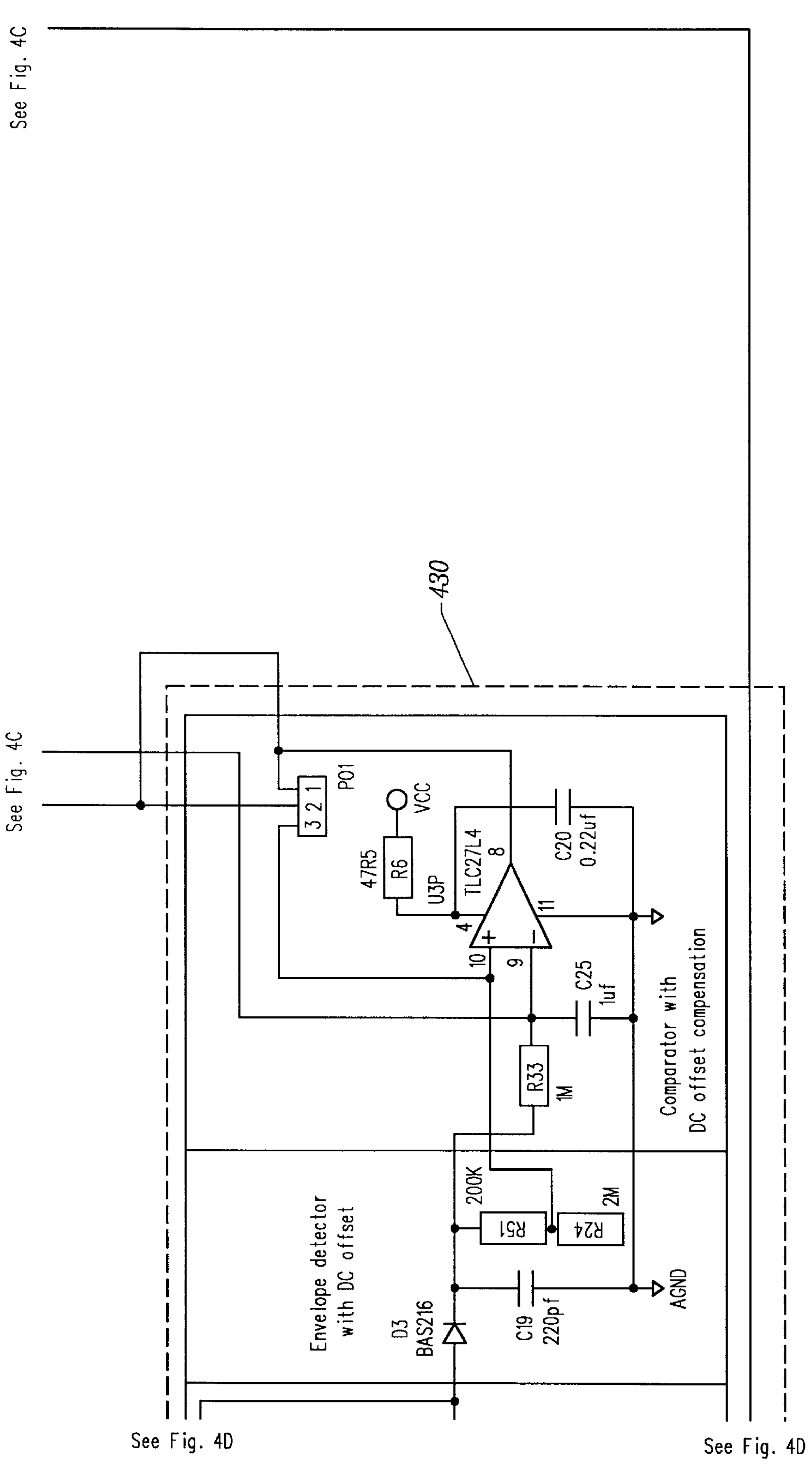

FIG. 3 shows one example of a simplified schematic diagram of a lighting control circuit 300, according to the embodiment of FIG. 1. FIG. 3 shows an LED 303, a detection circuit 305 and a driver circuit 334. Like detection circuit 210 of FIG. 1, detection circuit 305 detects the light level in a room. Specifically, LED 303 detects the light level in a room through a lens (not shown). In one embodiment, the lens is set such that the field of view for LED 303 is 60 degrees. The lens can be moved closer to or further from LED 303 to increase and decrease LED's 303 field of view. In this specific embodiment, a green LED is used. Other LEDs can also be used to detect light within other spectrums.

LED 303 picks up light and generates a small current, or electrical signal, proportional to the light. The output of LED 303 couples to a resistor 312 which is coupled to a inverting input of an op-amp 314. The non-inverting input of op-amp 314 couples to a ground potential. In this specific embodiment, op-amp 314 is a fixed gain amplifier. Embodiments of the present invention are not limited to this particular type of amplifier. The gain of op-amp 314 is set and controlled by resistors 316 and 318 in a manner well known to those in the art. Capacitors 320 and 322 couple between op-amp 314 and ground, providing stability to op-amp 314 in a manner well known to those in the art.

The amplified light signal is outputted from op-amp 314 to the non-inverting input of op-amp 324 via resistor 326. The inverting input of op-amp 324 couples to a ground potential via resistor 328. In this specific embodiment, op-amp 324 is an adjustable gain amplifier. Embodiments of the present invention are not limited to this particular type of amplifier. The gain of op-amp 324 is set and controlled by potentiometer 330 (also labeled SN in FIG. 5 and hereinafter referred to as pot SN 330) and resistor 332 in a manner well known to those in the art. Thus, the sensitivity of LED 303, i.e., gain of the detection circuit, can be adjusted by a user via pot SN 330. Pot SN 330 is described in more detail further below.

Detection circuit 305 increases the signal by 2 orders of magnitude (100×). The high-gain compensates for the low current generated by LED 303. The amplified signal is output from detection circuit 305 to a control circuit 334. Specifically, the amplified detected light level is outputted from op-amp 324 to the inverting input op-amp 336 via resistor 338.

Op-amp 336 outputs the difference between a reference voltage set at its non-inverting input and the signal output from op-amp 324. The non-inverting input of op-amp 336 couples to the wiper of a potentiometer 340 (also labeled EL in FIG. 3 and hereinafter referred to as pot EL 340). Pot EL 340 couples to a reference diode 342 via a resistor 344, and reference diode 342 couples to a ground potential. In this embodiment, reference diode 342 is a Zenor diode. The voltage at the non-inverting input of op-amp 336 is set between 0 volts and 0.6 volts, depending on the setting of pot EL 340. Resistor 348 couples to reference diode 342.

The response time of the control circuit to respond to changes in the detected light level is determined by the RC constant of op-amp 336. The RC constant can be adjusted according to the specific application. For example, in a manner well known to those in the art, the RC constant can be increased to delay the response time of the control circuit ensuring that it will not adjust the lighting if LED 303 is temporarily blocked by an object. Conversely, the RC constant can be decreased ensuring that the control circuit respond faster to light changes. Also, a faster response time is especially useful, for example, when a user makes adjustments to the light detector. With a faster response time, the user would only have to wait 15 seconds, for example, between adjustments rather than 60 seconds.

In the specific embodiment of FIG. 3, a switch 350 modifies the RC constant of op-amp 336. When switch 350 is open (either jumper removed or jumper over pins 1–2), the RC constant is set by resistor 338 and a capacitor 352. This produces a response time of about 60 seconds. When switch 350 is closed (jumper over pins 2–3), a resistor 354 couples in parallel with resistor 338 reducing the RC constant, thus making the circuit react faster to light changes. Accordingly, this produces a response time of about 15 seconds. Of course, those skilled in the art will recognize that additional resistors can be switched in and out to provide more than two response times to select from, or that changing the capacitance of the circuit can be done to change the time constant. Also, in combination with or in lieu of a switch resistor, jumper connectors and pins can be used to modify the RC constant.

The output of op-amp 336 couples to the collector of a Darlington transistor 358 via a resistor 359. A Darlington transistor 358 amplifies the output of op-amp 336 to increase the number of ballasts that can be controlled by the control circuit. Of course, those skilled in the art will readily recognize that various other amplification devices such as a single transistor or op-amp can be used in place of Darlington transistor 358.

In this specific embodiment, the emitter of Darlington transistor 358 couples to an output node 360, or electronic ballast node 360, via a resistor 362 and to a Zener diode 364. Reference diode 364 is a 12-volt Zener diode. It ensures that the voltage at node 360 does not increase above 12 volts and thus prevents damage to the circuit due to voltage spikes or if it is reverse connected. Node 360 couples to an electronic ballast which in turn couples to and controls lighting such as fluorescent lights. This specific embodiment is used with a dimming ballasts that use a 2–10 DC volt control signal.

When dimming, the driver circuit acts as a current sink which draws current from the current source incorporated into the electronic dimming ballast. By drawing a proper amount of current, a driving voltage results which in turn modifies the activity of the ballast.

The collector of Darlington transistor 358 couples to a pair of diodes 366. Diodes 366 ensure that potential at the collector of Darlington transistor 358 does not drop below 2 volts and thus ensures that the op-amps have a large enough power supply to operate correctly. The base of Darlington transistor 358 couples between a voltage divider which includes resistor 359 and a resistor 368. A resistor 370 couples between resistor 370 and capacitor 352. It is to be understood that this specific implementation as depicted and described herein is for illustrative purposes only, and that alternative circuit implementations exist for the same functionality.

In operation, driver circuit 334 matches the light signal to a set point or desired illumination level by controlling a light source thus controlling the amount of light that detector circuit 305 picks up. Specifically, when the voltage level (derived from the ambient light) of the inverting input of op-amp 336 is greater than the voltage level (provided by the set point) of non-inverting input of op-amp 336, its output voltage lowers to compensate for the difference. This causes Darlington transistor 358 to draw current from and lower the driving voltage of the electronic ballast via node 360. As a result, the lights controlled by the electronic ballast dim. As a result, the illumination, being a part of the opto-electric path, is detected by the light sensor. Thus a lower voltage will appear at the inverting input of op-amp 336. This continues until the ambient light level matches the desired light level. When the ambient light level is lower than the desired light level, the complement of the process just described occurs, until ambient light level matches the desired light level.

Note that the following is considered in the embodiments of the present invention. First, the variation of nighttime illumination, e.g., due to aging of fluorescent lights, ambient moon light, or lighting from adjacent rooms and/or hallways, is small compared with the potential variation of incoming sunlight. For example, the illumination output from a fluorescent light might decrease only about 10% or less during its lifetime.

Second, the main variable component of the ambient light is daylight. For example, the energy from sunlight could vary substantially throughout a given day because of clouds, window blinds, etc.

As it is apparent, some embodiments work under two essentially different conditions: during night and day. During the night they compensate for the small (aging) variations of illumination due to the fluorescent lights. During the day they compensate for the supplementary contribution of the daylight. In both situations an illumination level has to be set. To address this reality, some embodiments include two sets of adjustments, coping with the two before mentioned conditions.

Pot SN 330 (from the word "sensibility") controls the gain of detection circuit 305. The result of increasing the gain is in effect equivalent to the result of increasing the light contribution, and vice versa. In this specific embodiment, for example, the gain can range from 1 to 40 times. This is proportional to the illumination which can range from 1 to 40 foot candles. A gain would thus cause the driver circuit to perceive a greater light level in the viewed or controlled area. Also, as a result of the gain, the driver circuit can more readily dim the lights because more light is perceived.

Some embodiments of the invention use this feature (pot SN 330) to customize the system to a particular controlled area. Specifically, these embodiments can account for the reflective characteristics of a controlled area. For example, a room with a bright color scheme or with white papers laying on a desk top would be more reflective. Accordingly, a user can adjust pot SN 330 to lower the gain while maintaining the desired illumination. Conversely, a user can increase the gain via pot SN 330 to account for a room that is less reflective, e.g., a room with a dark color scheme.

As described, op-amp 336 compares and matches the voltage from detection circuit 305 to a reference voltage (set point). Also, the set point is adjusted by pot EL 340 (from the word "electric light"). Thus, the resulting illumination level is controlled by a combination of the pot SN 330 and pot EL 340 settings. For maximum accuracy, pot SN 330 is kept at the maximum gain that yields the desired light level.

Incidentally, pot EL 340 also controls the brightness range in which a dimmable ballast can operate light sources connected to it. Pot EL 340 does this by adjusting the voltage at the non-inverting input of op-amp 336. Examples of such light sources include lighting such as fluorescent, HID, incandescent lights, etc.

In this specific embodiment, pot EL 340 sets the light level under "no daylight" conditions. That is, it sets the lights to an appropriate level determined by a user at night. When pot EL 340 is set to its maximum resistance, the voltage at the non-inverting input is at its lowest level and the controlled light can be adjusted anywhere from 20 to 100 percent output. Conversely, when pot EL 340 is set to its minimum resistance, the voltage at the non-inverting input is at its highest level and the intensity of the controlled light can be adjusted along a relatively small range.

To illustrate how pot EL 340 is set, the actual illumination level might be at 50 fc (100% of maximum illumination for example) due to a maximum driving voltage of 10 volts at the electronic ballast. Extra energy is consumed unnecessarily if only 40 fc (80% of maximum illumination) is necessary. Thus, the set point or desired illumination level should be lowered, e.g., 40 fc. To lower the actual illumination level down to 40 fc, the driving voltage at the electronic ballast should be lowered to approximately 8 volts. This would be done by adjusting pot EL 340 until the ambient light drops to 40 fc. A photometer can be used to measure the 40 fc.

Specific embodiments of the present invention are presented above for purposes of illustration and description. Embodiments can include circuits that are purely analog, purely digital, or a combination of the both.

FIGS. 4A–4E show a simplified schematic diagram of a lighting control circuit 400, according to another embodiment of the present invention. Lighting control circuit 400 includes at least one LED (not shown) that emits light when driven by a current and detects light when the current is turned off. The LED might emit light for various purposes such as to indicate that the sensor on, for example, or to indicate that motion has been detected or other purposes. More details as to the spectrum in which the LED detects and emits light are described above (see description of FIG. 2). The LED outputs a signal in response to light it detects, and the LED detects a spectrum within a certain range. Generally, that range approximates a photopic luminosity curve. The LED can operate, i.e., detect or emit light, in various spectrums depending on LED and the specific application. For example, it can be red, blue, green, etc., each of which covers different spectrums. Also lighting control circuit 400 can have more than one LED depending on the specific application. By using more than one LED, the precise spectrum can be controlled, e.g., widened, narrowed, shifted, etc. The lighting control circuit is configured to calibrate at least one of the LED's characteristics to correct for variations from the manufacturing process.

Lighting control circuit 400 further includes a driver circuit 402. Driver circuit 402 couples to the LED and is configured to provide a current-to-voltage transfer ratio for operating with the LED. Driver circuit 402 converts the signal from the LED from a current to a voltage. The voltage is then amplified for processing.

Lighting control circuit 400 further includes a microcontroller 410. Microcontroller 410 couples to the LED and to driver circuit 402. Microcontroller 410 functions as, among other things, a multiplexer. Hereinafter microcontroller 410 is also referred to as MUX 410 to signify its multiplexing function. MUX 410 is part of the hardware and software of microcontroller 410. MUX 410 is configured to select one of at least two modes. The LED has a first polarity during a first mode and has a second polarity during a second mode. During the first mode, the LED emits light when driven by a current. During the second mode, the LED detects light when the current is turned off. In this specific embodiment, MUX 410 alternates between the first and second modes at a frequency greater than 50 Hz. At a frequency of at least 50 Hz, the human could not detect the polarity switching. At this frequency, the LED appears to be continuously on. In other embodiments, the manner of selection as well as the number of modes will depend on the specific application.

In this specific embodiment, microcontroller 410 provides the current to the LED during the first mode, and driver circuit 402 receives a current from LED during the second mode. In other embodiments, the LED's current source and destination can be otherwise depending on the specific application. Typically, the current delivered to the LED is in the range of milliamps, and the current generated by the LED is in the range of picoamps.

Microcontroller 410 is configured to process the signal generated by the LED. Microcontroller 410 then generates a second signal. The second signal controls an illumination level of one or more lights. The second signal varies in response to the signal generated by the LED. One or more lights can be controlled by lighting control circuit 400 in response to each LED. The mapping of the LEDs to the lights will depend on the specific application.

Lighting control circuit 400 also includes an interface circuit 414 which interfaces with the outside world via a modular jack 416. Interface circuit 414 couples to remote sensors (not shown), each of which operates with an LED. Interface circuit 414 can also couple to a central computer (not shown) for controlling the remote sensors. In this specific embodiment, interface circuit 414 includes a motion sensor 420. Motion sensor 420 includes a passive infrared receiver (PIR) 422 which can detect motion in a given area.

Lighting control circuit 400 also includes a light level and timer circuit 426. Light level and timer circuit 426 can be controlled by users in the areas affected by the lighting control circuit. For example, if there is more one LED sensor, e.g., one in each of several areas, a user in a given area can control the light level and timing in that area.

Lighting control circuit 400 also includes an infrared receiver 430 for detecting light from the sun. Also included is a reference voltage output circuit 440 for fine tuning motion sensor 420.

The lighting control circuit of the present invention and its various implementations can be applied in a multitude of ways. Possible applications include but are not limited to energy savings. Embodiments of the present invention can have a number of applications. In one example, as described above, the lighting control circuit can be used for illumination management where the visible spectrum is the main target.

Conclusion

In conclusion, it can be seen that embodiments of the present invention provide numerous advantages and elegant techniques for controlling lighting. Principally, it detects a spectrum of light close to that which the human eye detects. It uses an LED as a light sensor making it simple and inexpensive to make. It also eliminates problems associated with conventional wide spectrum photodetectors. It is also eliminates the costs associated with expensive optical filters.

Specific embodiments of the present invention are presented above for purposes of illustration and description. The full description will enable others skilled in the art to best utilize and practice the invention in various embodiments and with various modifications suited to particular uses. After reading and understanding the present disclosure, many modifications, variations, alternatives, and equivalents will be apparent to a person skilled in the art and are intended to be within the scope of this invention. Moreover, the described circuits and method can be implemented in a multitude of different forms such as software, hardware, or a combination of both in a variety of systems. Moreover, the circuits described can be purely analog, purely digital, or mixed. Moreover, the circuits described can be linked to other circuits in a network. Therefore, it is not intended to be exhaustive or to limit the invention to the specific embodiments described, but is intended to be accorded the widest scope consistent with the principles and novel features disclosed herein, and as defined by the following claims.

What is claimed is:

1. A lighting control circuit comprising:

an LED that outputs a first signal in response to being exposed to radiation;

a detection circuit coupled to the LED, the detection circuit configured to generate a second signal from the first signal; and a driver circuit coupled to the detection circuit, the driver circuit configured to generate a third signal to control an illumination level of one or more lights, wherein the third signal is varied in response to the second signal.

2. The circuit of claim 1 wherein the driver circuit receives the second signal and compares it to a fourth signal, and wherein the driver circuit is configured to match the second signal with the fourth signal via a loop, thereby either raising or lowering the illumination level of one or more lights until the second signal and the fourth signal match.

3. The circuit of claim 1 wherein the first signal is amplified.

4. The circuit of claim 1 wherein a light spectrum detected by the LED substantially mimics the photopic curve.

5. The circuit of claim 1 wherein the fourth signal is adjustable and represents a set illumination level.

6. The circuit of claim 1 wherein the lighting control circuit adjusts the ambient light in response to changes in the ambient light.

7. A lighting control circuit comprising:

an LED that outputs a first signal in response to being exposed to radiation;

a detection circuit coupled to the LED, the detection circuit configured to generate a second signal from the first signal;

a driver circuit coupled to the detection circuit, the driver circuit configured to generate a third signal to control an illumination level of one or more lights, wherein the third signal is varied in response to the second signal, and wherein the driver circuit receives the second signal and compares it to a fourth signal;

a loop comprising an opto-electric path and an electronic path, the opto-electric path traveling from a light source controlled by the lighting control circuit to the LED via the radiation from the light, the electronic path traveling from the LED to the light source via the lighting control circuit, wherein the driver circuit is configured to match the second signal to the fourth signal via the loop, thereby either raising or lowering the illumination level of one or more lights until the second signal and the fourth signal match.

8. A method for controlling the brightness level of a light, the method comprising:

exposing an LED to radiation;

outputting from the LED a first signal in response to the radiation exposure;

generating a second signal in response to detection of the first signal; and generating a third signal to control an illumination level of one or more lights, wherein the third signal is varied in response to the second signal.

9. The method of claim 8 wherein generating the second signal comprises amplifying the first signal.

10. The method of claim 8 wherein generating the third signal comprises comparing the second signal to a fourth signal and matching the second and fourth signals.

11. The method of claim 10 wherein the step of matching further comprises adjusting an ambient light level until the second signal matches the fourth signal.

12. The circuit of claim 8 wherein a light spectrum detected by the LED substantially mimics the photopic curve.

13. A lighting control circuit comprising:

an LED that emits light when driven by a current and detects light when the current is turned off, the LED outputting a first signal in response to a detected light;

a driver circuit coupled to the LED, the first driver circuit being configured to provide a current-to-voltage transfer ratio to operate with the LED; and a processor circuit coupled to the driver circuit, the processor circuit being configured to process the first signal and to generate a second signal, the second signal controlling an illumination level of one or more lights, the second signal being varied in response to the first signal.

14. The circuit of claim 13 wherein the LED detects a spectrum that approximates a photopic luminosity curve.

15. The circuit of claim 14 wherein the photopic luminosity curve approximates a C.I.E. relative photopic luminosity curve.

16. A lighting control circuit comprising:

an LED that emits light when driven by a current and detects light when the current is turned off, the LED outputting a first signal in response to a detected light;

a driver circuit coupled to the LED, the first driver circuit being configured to provide a current-to-voltage transfer ratio to operate with the LED; and a multiplexer coupled to the driver circuit, the multiplexer being configured to select a first mode and a second mode, the LED having a first polarity during the first mode, the LED having a second polarity during the second mode, wherein during the first mode the LED emits light when driven by a current, and wherein during the second mode the LED detects light and generates the first signal when the current is turned off, wherein the lighting control circuit controls an illumination level of one or more lights in response to the first signal.

17. The circuit of claim 16 wherein the LED detects a spectrum that approximates a photopic luminosity curve.

18. The circuit of claim 16 wherein the LED alternates between the first and second modes.

19. The circuit of claim 16 wherein the multiplexer alternates between the first and second modes at a frequency greater than 50 Hz.

20. The circuit of claim 16 wherein the photopic luminosity curve approximates a C.I.E. relative photopic luminosity curve.

21. A lighting control circuit comprising an LED that outputs a first signal in response to being exposed to radiation, the lighting control circuit being configured to generate a second signal derived from the first signal, wherein the second signal controls an illumination level of one or more lights.

22. The circuit of claim 21 wherein the LED detects a spectrum that approximates a photopic luminosity curve.

23. A lighting control circuit comprising:

an LED that emits light when driven by a current and detects light when the current is turned off, the LED outputting a first signal in response to a detected light, wherein the light control circuit is configured to supply current to the LED during a first mode and process the first signal during a second mode, wherein during the second mode, the lighting control circuit generates a second signal derived from the first signal, wherein the second signal controls an illumination level of one or more lights.

24. The circuit of claim 23 wherein the LED detects a spectrum that approximates a photopic luminosity curve.

25. A method for controlling the brightness level of a light, the method comprising:

exposing an LED to radiation;

outputting from the LED a first signal in response to the radiation exposure; and generating a second signal derived from detection of the first signal, wherein the second signal controls an illumination level of one or more lights.

26. The circuit of claim 25 wherein the LED detects a spectrum that approximates a photopic luminosity curve.

* * * * *

UNITED STATES PATENT AND TRADEMARK OFFICE
CERTIFICATE OF CORRECTION

PATENT NO. : 6,617,560 B2
DATED : September 9, 2003
INVENTOR(S) : Ulrich Forke

It is certified that error appears in the above-identified patent and that said Letters Patent is hereby corrected as shown below:

Title page,
Item [*] Notice, "0 days" should read -- 31 days --

Signed and Sealed this

Twenty-second Day of March, 2005

JON W. DUDAS
*Director of the United States Patent and Trademark Office*